United States Patent
Kim et al.

(10) Patent No.: US 8,923,179 B2
(45) Date of Patent: Dec. 30, 2014

(54) TERMINAL FOR CONTROLLING UPLINK TRANSMISSION POWER AND AN UPLINK TRANSMISSION POWER CONTROL METHOD IN A WIRELESS COMMUNICATION SYSTEM

(75) Inventors: Dongcheol Kim, Anyang-si (KR); Wookbong Lee, Anyang-si (KR); Hangyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 227 days.

(21) Appl. No.: 13/696,592

(22) PCT Filed: May 6, 2011

(86) PCT No.: PCT/KR2011/003399
§ 371 (c)(1),
(2), (4) Date: Nov. 6, 2012

(87) PCT Pub. No.: WO2011/139120
PCT Pub. Date: Nov. 10, 2011

(65) Prior Publication Data
US 2013/0051297 A1  Feb. 28, 2013

Related U.S. Application Data

(60) Provisional application No. 61/332,207, filed on May 7, 2010.

(51) Int. Cl.
*H04W 52/28* (2009.01)
*H04W 88/02* (2009.01)
*H04W 52/14* (2009.01)
*H04W 52/30* (2009.01)
*G08C 17/00* (2006.01)
*H04W 52/48* (2009.01)
*H04W 52/42* (2009.01)

(52) U.S. Cl.
CPC ............ *H04W 52/146* (2013.01); *H04W 52/48* (2013.01); *H04W 52/42* (2013.01)

USPC ............ 370/311; 370/329; 370/344; 455/522

(58) Field of Classification Search
USPC .......................................... 370/310–350, 458
See application file for complete search history.

(56) References Cited

U.S. PATENT DOCUMENTS

| | | | |
|---|---|---|---|
| 7,403,791 B2* | 7/2008 | Oki et al. ...................... | 455/522 |
| 2009/0097466 A1* | 4/2009 | Lee et al. ...................... | 370/344 |
| 2009/0213803 A1* | 8/2009 | Lee et al. ...................... | 370/329 |
| 2010/0272047 A1* | 10/2010 | Zhu et al. ...................... | 370/329 |

FOREIGN PATENT DOCUMENTS

KR   1020030013603   2/2003
KR   1020050045912   5/2005

OTHER PUBLICATIONS

PCT International Application No. PCT/KR2011/003399, Written Opinion of the International Searching Authority, dated Dec. 19, 2011, 15 pages.

* cited by examiner

*Primary Examiner* — Timothy J Weidner
*Assistant Examiner* — Jana Blust
(74) *Attorney, Agent, or Firm* — Lee, Hong, Degerman, Kang & Waimey

(57) ABSTRACT

Disclosed are a terminal for controlling uplink transmission power and an uplink transmission power control method in a wireless communication system. In the terminal according to the present invention, if the total sum of uplink transmission power values respectively determined for a plurality of transmission channels is greater than the maximum transmission power value of the terminal, a processor can allocate respective uplink transmission power values sequentially in accordance with priority rankings across the plurality of transmission channels which have been determined in advance, starting from the transmission channel corresponding to the highest priority ranking. An emitter can simultaneously transmit the plurality of transmission channels with each of the allocated uplink transmission power values.

12 Claims, 2 Drawing Sheets

TERMINAL FOR CONTROLLING UPLINK TRANSMISSION POWER AND AN UPLINK TRANSMISSION POWER CONTROL METHOD IN A WIRELESS COMMUNICATION SYSTEM

CROSS-REFERENCE TO RELATED APPLICATIONS

This application is the National Stage filing under 35 U.S.C. 371 of International Application No. PCT/KR2011/003399, filed on May 6, 2011, which claims the benefit of U.S. Provisional Application Ser. No. 61/332,207, filed on May 7, 2010, the contents of which are all hereby incorporated by reference herein in their entirety.

TECHNICAL FIELD

The present invention relates to wireless communication, and more particularly, to a user equipment for controlling uplink transmit power and an uplink transmit power control method of the user equipment.

BACKGROUND ART

A next-generation multimedia wireless communication system, into which extensive research is ongoing, is required to process various types of information such as image data and radio data at high data transmission rate, beyond initial voice-oriented services.

Recently, attention has been paid to Orthogonal Frequency Division Multiplexing (OFDM) capable of processing data at high transmission rate. OFDM refers to a multi-carrier modulation scheme in which a frequency band is split into a plurality of orthogonal subcarriers to transmit data. OFDM can attenuate inter-symbol interference with low complexity. In OFDM, serially input data symbols are converted into N parallel data symbols and the converted parallel data symbols are transmitted in the N split subcarriers.

Subcarriers maintain orthogonality in the frequency domain. Each orthogonal channel experiences independent frequency selective fading and inter-symbol interference can be minimized because the interval between transmitted symbols is increased. Orthogonal Frequency Division Multiple Access (OFDMA) refers to a multiple access scheme for achieving multiple access by independently providing a part of available subcarriers to each user in a system using OFDM as a modulation scheme. OFDMA provides each user with frequency resources called subcarriers. Respective frequency resources are independently provided to a plurality of users so that frequency resources do not overlap in general. Consequently, the frequency resources are exclusively allocated to users. In an OFDMA system, frequency diversity for multiple users can be obtained through frequency selective scheduling and subcarriers can be allocated in various forms according to a permutation scheme for subcarriers.

When a User Equipment (UE) transmits an uplink (UL) signal to an eNode B (eNB) in some wireless communication systems, a UL control channel on which control signals are transmitted can be physically distinguished from a UL data channel on which data is transmitted and a plurality of control/data channels may be simultaneously transmitted using one symbol. The transmit powers of UL transport channels (or transmission channels) may be determined through a specific equation.

Meanwhile, a maximum transmittable power that can be allocated for UL transmission by the UE is determined according to bandwidth allocated to the UE, processing performance of the UE, battery performance of the UE, and the like. Accordingly, if the total sum of transmission powers necessary for simultaneously transmitting a plurality of transport channels exceeds the maximum transmittable power, proper UL transmission cannot be performed.

Accordingly, there is needed a method for effectively allocating powers to a plurality of UL transport channels transmitted simultaneously using different physical regions.

DETAILED DESCRIPTION OF THE INVENTION

Technical Problems

It is a technical object of the present invention to provide a method for a UE to control UL transmit power.

It is another technical object of the present invention to provide a UE for controlling UL transmit power.

It will be appreciated by persons skilled in the art that that the technical objects that can be achieved through the present invention are not limited to what has been particularly described hereinabove and other technical objects of the present invention will be more clearly understood from the following detailed description.

Technical Solutions

To achieve the above technical object, a method for controlling an uplink transmit power by a user equipment according to the present invention includes determining uplink transmit power value for a plurality of allocated transmission channels; sequentially allocating the uplink transmit power values to the transport channels starting from a transport channel corresponding to the highest priority according to predefined priorities of the plurality of transport channels if the total sum of each of the determined uplink transmit power values for the plurality of transport channels is greater than a maximum transmit power value of the user equipment; and simultaneously transmitting the plurality of transmission channels with the allocated uplink transmit power values, wherein the transmission channel having the highest priority is a Hybrid Automatic Repeat reQuest (HARQ) feedback channel for responding to whether at least one of a downlink persistent allocation A-MAP IE message, a feedback allocation A-MAP IE message, an uplink persistent allocation A-MAP IE message, and a feedback polling A-MAP IE message has been successfully received. A transmission channel having the lowest priority among the priorities may be a HARQ feedback channel for responding to whether messages except for the downlink persistent allocation A-MAP IE message, the feedback allocation A-MAP IE message, the UL persistent allocation A-MAP IE message, and the feedback polling A-MAP IE message have been successfully received. Sequentially allocating the uplink transmit power values may include allocating the uplink transmit power values in order of the HARQ feedback channel, a Primary Fast Feedback Channel (PFBCH)/Secondary Fast Feedback Channel (SF-BCH), a synchronized ranging channel, a sounding channel, a data channel, and a bandwidth request channel. Sequentially allocating the uplink transmit power values may include allocating a difference value between the maximum transmit power value of the user equipment and a total uplink transmit power value allocated to one or more transmission channels according to a predefined priority as an uplink transmit power value for a specific transmission channel, when the difference value is less than the determined uplink transmit power value for the specific transmission channel to which the determined uplink transmit power value is not allocated. The plurality of transmission channels may include data channels and control channels. The maximum transmit power value of the user equipment may be a predefined value for the user equipment or a value determined by the user equipment.

To achieve the above another technical object, a user equipment for controlling uplink transmit power includes a processor configured to sequentially allocate uplink transmit power values to a plurality of transmission channels starting from a transmission channel corresponding to the highest priority according to predefined priorities of the plurality of transmission channels, if the total sum of each of the determined uplink transmit power values for the plurality of transmission channels is greater than a maximum transmit power value of the user equipment; and a transmitter configured to simultaneously transmit the plurality of transmission channels with the allocated uplink transmit power values, wherein the transmission channel having the highest priority is a Hybrid Automatic Repeat reQuest (HARQ) feedback channel for responding to whether at least one of a downlink persistent allocation A-MAP IE message, a feedback allocation A-MAP IE message, an uplink persistent allocation A-MAP IE message, and a feedback polling A-MAP IE message has been successfully received. A transmission channel having the lowest priority among the priorities may be a HARQ feedback channel for responding to whether messages except for the downlink persistent allocation A-MAP IE message, the feedback allocation A-MAP IE message, the uplink persistent allocation A-MAP IE message, and the feedback polling A-MAP IE message have been successfully received. The processor may allocate the uplink transmit power values in order of the HARQ feedback channel, a Primary Fast Feedback Channel (PFBCH)/Secondary Fast Feedback Channel (SFBCH), a synchronized ranging channel, a sounding channel, a data channel, and a bandwidth request channel. The processor may allocate a difference value between the maximum transmit power value of the user equipment and a total uplink transmit power value allocated to one or more transmission channels according to a predefined priority as an uplink transmit power value for a specific transmission channel, when the difference value is less than the determined uplink transmit power value for the specific transmission channel to which the determined uplink transmit power value is not allocated. The plurality of transmission channels may include data channels and control channels. The maximum transmit power value of the user equipment may be a value predefined with respect to the user equipment or a value determined by the user equipment.

Advantageous Effects

According to various embodiments of the present invention, communication performance can be remarkably improved by setting priorities for allocating UL transmit powers to transport channels and by allocating the UL transmit powers according to the priorities.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Hereinafter, exemplary embodiments of the present invention will be described with reference to the accompanying drawings. The detailed description, which will be disclosed along with the accompanying drawings, is intended to describe exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details. For example, although the following detailed description is given based upon an IEEE 802.16m system, aspects of the present invention that are not specific to the IEEE 802.16m system are applicable to other mobile communication systems.

In some instances, known structures and/or devices are omitted or are shown in block diagram form focusing on important features of the structures and/or devices, so as not to obscure the concept of the present invention. The same reference numbers will be used throughout this specification to refer to the same or like parts.

In the following description, User Equipment (UE) is assumed to refer to a mobile or fixed user end device such as a Mobile Station (MS), an Advanced Mobile Station (AMS), etc. and eNode B (eNB) is assumed to refer to any node of a network end, such as a Node B, a Base Station (BS), an Access Point (AP), etc., communicating with the UE.

In a mobile communication system, a UE may receive information from an eNB on a downlink (DL) and transmit information to the eNB on a UL. The information transmitted or received by the UE includes data and various control information and a variety of physical channels are defined according to the types and usages of the information.

Figure 1:
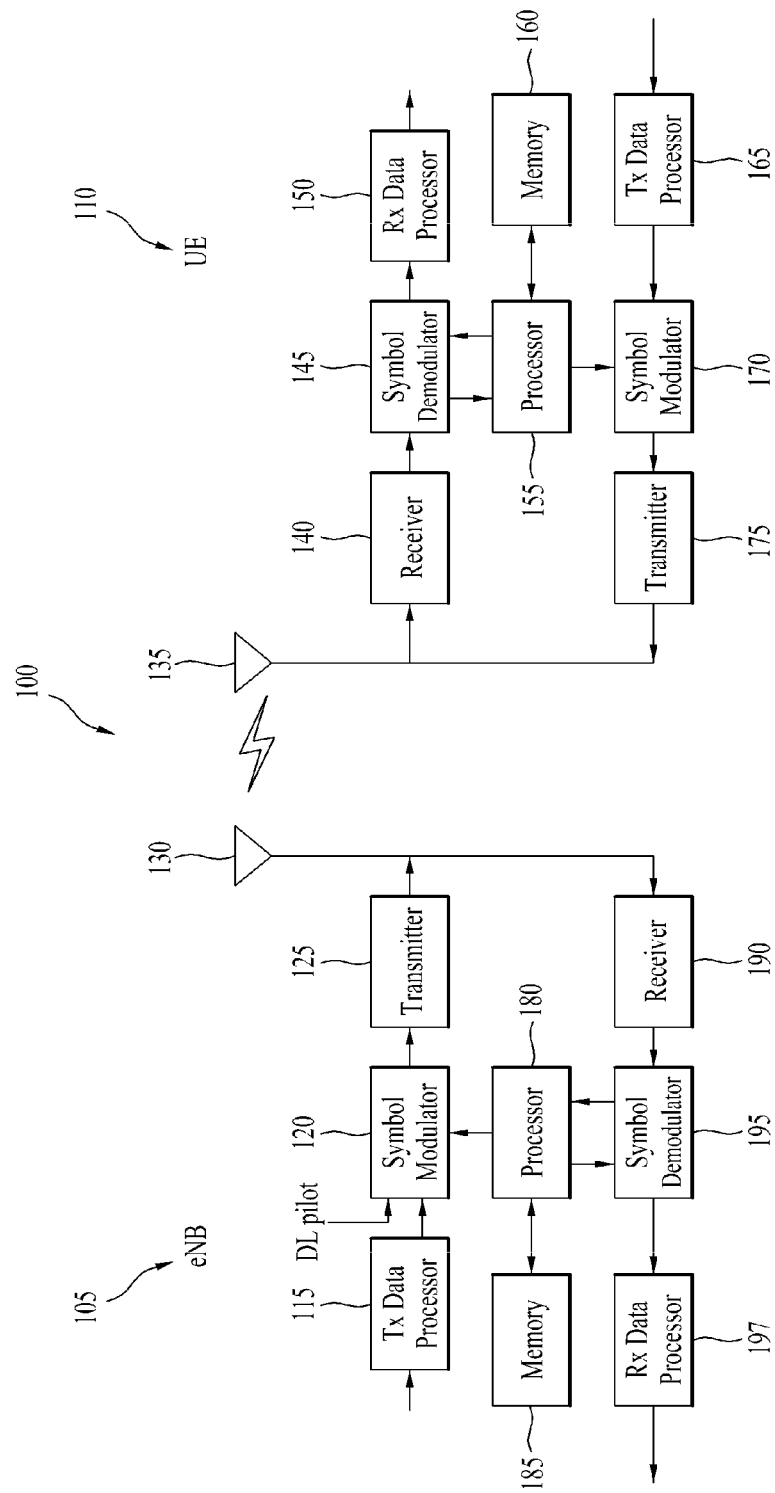
FIG. 1 is a block diagram illustrating the configuration of an eNB and a UE in a wireless communication system.

FIG. 1 is a block diagram illustrating the configuration of an eNB and a UE in a wireless communication system.

While one eNB 105 and one UE 110 are shown in FIG. 1 to simplify the configuration of a wireless communication system 100, the wireless communication system 100 may obviously include a plurality of eNBs and/or a plurality of UEs.

Referring to FIG. 1, the eNB 105 may include a Transmission (Tx) data processor 115, a symbol modulator 120, a transmitter 125, a Transmission/Reception (Tx/Rx) antenna 130, a processor 180, a memory 185, a receiver 190, a symbol demodulator 195, and an Rx data processor 197. The UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. While the antennas 130 and 135 are each shown as a single antenna in the eNB 105 and the UE 110, the eNB 105 and the UE 110 may each have a plurality of antennas. Accordingly, the eNB 105 and the UE 110 according to the present invention support a Multiple Input Multiple Output (MIMO) system. In addition, the eNB 105 according to the present invention may also support both Single User-MIMO (SU-MIMO) and Multi User-MIMO (MU-MIMO).

On the DL, the Tx data processor 115 receives traffic data and formats, codes, interleaves, and modulates (or symbol-maps) the received traffic data, thereby providing modulated symbols (or "data symbols"). The symbol modulator 120 processes the data symbols received from the Tx data processor 115 and pilot symbols, thereby providing a symbol stream.

The symbol modulator 120 multiplexes the data symbols with the pilot symbols and transmits the multiplexed symbols to the transmitter 125. Each transmission symbol may be a data symbol, a pilot symbol, or a signal of a zero value. The pilot symbols may be transmitted successively during each symbol period. The pilot symbols may be Frequency Division Multiplexing (FDM) symbols, Orthogonal Frequency Division Multiplexing (OFDM) symbols, Time Division Multiplexing (TDM) symbols, or Code Division Multiplexing (CDM) symbols.

The transmitter 125 converts the symbol stream into one or more analog signals and generates a DL signal suitable for transmission on a radio channel by additionally processing the analog signals (e.g. through amplification, filtering, and frequency up-conversion). The DL signal is transmitted to the UE 110 through the antenna 130.

The Rx antenna 135 receives the DL signal from the eNB 105 and provides the received DL signal to the receiver 140. The receiver 140 processes the DL signal (e.g. through filtering, amplification and frequency down-conversion) and converts the processed DL signal into digital samples. The symbol demodulator 145 demodulates received pilot symbols and outputs the demodulated pilot symbols to the processor 155 for use in channel estimation.

The symbol demodulator 145 receives a frequency response estimate of the DL from the processor 155, acquires data symbol estimates (i.e. estimates of the transmitted data symbols) by demodulating the received data symbols, and provides the data symbol estimates to the data processor 150. The Rx data processor 150 demodulates (i.e. symbol-demaps) the data symbol estimates and deinterleaves and decodes the demodulated data symbols, thereby recovering the traffic data transmitted by the eNB 105.

The operations of the symbol demodulator 145 and the Rx data processor 150 are complementary to the operations of the symbol modulator 120 and the Tx data processor 115 of the eNB 105.

On the UL, the Tx data processor 165 of the UE 110 outputs data symbols by processing received traffic data. The symbol modulator 170 multiplexes the data symbols received from the Tx data processor 165, modulates the multiplexed symbols, and outputs a symbol stream to the transmitter 175. The transmitter 175 generates a UL signal by processing the symbol stream and transmits the uplink signal to the eNB 105 through the antenna 135.

The eNB 105 receives the UL signal from the UE 110 through the Rx antenna 130. The receiver 190 of the eNB 105 acquires samples by processing the UL signal. The symbol demodulator 195 provides UL pilot symbol estimates and UL data symbol estimates by processing the samples. The Rx data processor 197 processes the data symbol estimates, thereby recovering the traffic data transmitted by the UE 110.

The processors 155 and 180 of the UE 110 and the eNB 105 command (e.g. control, adjust, and manage) operations of the UE 110 and the eNB 105. The processors 155 and 180 may be connected respectively to the memories 160 and 185 that store program code and data. The memories 160 and 185 store an operating system, applications, and general files in conjunction with the processors 155 and 180.

The processors 155 and 180 may also be called controllers, microcontrollers, microprocessors, or microcomputers. Meanwhile, the processors 155 and 180 may take various forms, for example, hardware, firmware, software, or a combination thereof. In a hardware configuration, the processors 155 and 180 may include Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) which are adapted to implement the present invention.

In a firmware or software configuration, the firmware or software may be implemented in the form of a module, a procedure, a function, etc. performing the functions or operations of the present invention. The firmware or software may be included in the processors 155 and 180 and stored in the memories 160 and 185 so as to be executed by the processors 155 and 180.

The layers of radio interface protocols between the UE and the eNB may be classified into a first layer L1, a second layer L2, and a third layer L3 based on the three lowest layers of the Open System Interconnection (OSI) model. A physical layer corresponds to the first layer and provides an information transmission service on physical channels. A Radio Resource Control (RRC) layer corresponds to the third layer L3 and provides radio control resources between the UE and a network. The UE and eNB exchange RRC messages with a wireless communication network through the RRC layer.

Hereinafter, a method for the UE to determine a UL transmit power in an IEEE 802.16m system that is an example of a mobile communication system will be briefly described. Generally, upon transmitting a UL signal, the UE needs to determine a UL transmit power value using the following Equation 1.

$$P(\text{dBm}) = L + \text{SINR}_{Target} + NI + \text{Offset} \qquad [\text{Equation 1}]$$

where P is a transmit power level (dBM) per subcarrier per stream for current transmission, L is a current average DL propagation loss estimated by the UE, that includes transmit antenna gain and path loss, $\text{SINR}_{Target}$ is a Signal to Interference plus Noise Ratio (SINR) of a target UL signal received from the eNB, NI is an average noise and interference level (dBm) per subcarrier, estimated by the eNB and received by the UE from the eNB, and Offset is a value for power correction per UE. The offset value is received by the UE through a power control message from the eNB. There are two kinds of Offset values, Offsetdata and Offsetcontrol, which are used for data transmission (data channel transmission) and control information transmission (control channel transmission), respectively.

In the case of a control channel for transmitting control information, the UE may apply a target SINR corresponding to the control channel to Equation 1 using the following predefined Table 1.

TABLE 1

| Control Channel Type | $\text{SINR}_{Target}$ Parameters |
| --- | --- |
| HARQ Feedback | targetHarqSinr |
| Synchronized Ranging | targetSyncRangingSinr |
| P-FBCH | targetPfbchSinr |
| S-FBCH | targetSfbchBaseSinr |
|  | targetSfbchDeltaSinr |
| Bandwidth Request | targetBwRequestSinr |

However, upon transmitting data, the UE needs to set the target SINR value using Equation 2 below.

$$SINR_{Target} = \\ 10\log 10\left(\max\left(10^{\wedge}\left(\frac{SINR_{MIN}(dB)}{10}\right), \gamma_{IoT} \times SIR_{DL} - \alpha\right)\right) - \\ \beta \times 10\log 10(TNS)$$ [Equation 2]

Here, $SINR_{MIN}(dB)$ is a minimum SINR value demanded by the eNB and a value set by a unicast power control message. $SINR_{MIN}$ is expressed in 4 bits and may be one value of $\{-\infty, -3, -2.5, -1, 0, 0.5, 1, 1.5, 2, 2.5, 3, 3.5, 4, 4.5\}$ for example. $SIR_{DL}$ denotes a DL signal-to-interference power ratio measured by the UE.

γIoT is a fairness and IoT control factor broadcast by the eNB to the UE. Alpha (α) is a factor according to the number of receive antennas in the eNB and may be set as 3-bit MAC power control mode signaling. Alpha (α) may be expressed as a value, for example, $\{1, \frac{1}{2}, \frac{1}{4}, \frac{1}{8}, \frac{1}{16}, 0\}$. Beta (β) may be set as 0 or 1 of 1-bit MAC power control mode signaling.

TNS is the total number of streams in a Logical Resource Unit (LRU) indicated by UL-A-MAP IE. In the case of SU-MIMO, TNS is set as Mt of the number of streams per user and, in the case of CSM, TNS is set as TNS of the total number of streams. In control channel transmission, TNS may be set as 1.

In this way, the processor 155 of the UE may determine the UL transmit power using parameters L, NI, offset, and $SINR_{Target}$.

There may occur the case where the UE simultaneously transmits multiple channels (e.g. concurrent transmission of multiple control channels, concurrent transmission of control and data channels, and concurrent transmission of multiple data channels). However, a maximum transmit power value with which the UE can simultaneously transmit signals is limited to a prescribed value (e.g. 23 dBm). Accordingly, the processor 155 of the UE needs to allocate a transmit power within the maximum transmit power value even when simultaneously transmitting multiple channels. That is, in order to simultaneously transmit allocated transport channels (transmission channels), the processor 155 of the UE may determine the UL transmit power values of the allocated transport channels using the above Equation 1. Next, if the total sum of the UL transmit power values of the allocated transport channels determined by the processor 155 of the UE is less than a maximum transmit power value of the UE, the UE may simultaneously transmit the allocated transport channels with the determined UL transmit power values. However, if the total sum of the UL transmit power values of the allocated transport channels determined (or calculated) by the processor 155 of the UE is greater than the maximum transmit power value of the UE, the processor 155 of the UE needs to allocate the UL transmit powers to the allocated channels within the range of the maximum transmit power value in order of a preset priority. Here, the maximum transmit power value of the UE may be a predefined value or a value determined by the UE. As an example, the UE may preset a value indicated by the eNB through signaling as the maximum transmit power value. Alternatively, the UE may determine the smaller of a maximum transmit power value signaled by the eNB and a maximum transmit power value that can be output through a power amplifier by hardware as the maximum transmit power value. Generally, since the UE determines the maximum transmit power value based on modulation, resource size, etc. at a transmission moment, the maximum transmit power value may vary from one transmission to the next.

In this case, it is important for the UE to determine to which channel a high priority is assigned to allocate a transmit power value in terms of communication performance. The present invention proposes a method for the processor 155 of the UE to allocate UL transmit powers to allocated transport channels in order of priority, when the total sum of UL transmit powers of allocated transport channels exceeds a preset maximum transmit power value of the UE.

According to the present invention, when the UE needs to simultaneously transmit a plurality of the transport channels (i.e. when a plurality of transport channels is allocated), the processor 155 of the UE may calculate (determine) UL transmit power values for transmitting a plurality of transport channels using the above Equation 1. If the total sum of the calculated UL transmit power values of the transport channels is greater than the maximum transmit power value of the UE, the processor 155 of the UE allocates the UL transmit powers in order of a preset priority with respect to the multiple transport channels and the UE may simultaneously transmit the plurality of transport channels with the allocated UL transmit power values. In the present invention, priorities for determining UL transmit powers of transport channels will be described in detail by way of example.

Transport channels that the UE can simultaneously transmit include a HARQ feedback channel, a UL Primary Fast Feedback Channel (PFBCH), a UL Secondary Fast Feedback Channel (SFBCH), a Synchronized-Ranging Channel (S-RCH), a sounding channel, a data channel, and a Bandwidth Request Channel (BRCH).

The following Table 2 indicates an example of priorities of transport channels, transmit powers of which are determined by the UE.

TABLE 2

| Priority | Channel Type |
| --- | --- |
| 1 | HARQ feedback |
| 2 | PFBCH/SFBCH |
| 3 | Synchronized Ranging |
| 4 | Sounding |
| 5 | DATA |
| 6 | Bandwidth Request |

Referring to Table 2, transport channels may be generally divided into data channels for data transmission and control channels for control information transmission. While UL data has the opportunity for retransmission using link adaptation or Hybrid Automatic Repeat reQuest (HARQ), UL control signals have no opportunity for retransmission because HARQ is not performed. Accordingly, it is necessary to assign a higher priority to a control channel than to a data channel.

However, a bandwidth request which may be performed using various methods has plenty of opportunity to perform retransmission. A UE that has not received an acknowledgement (ACK) signal of a bandwidth request from an eNB may perform, for example, a random access based bandwidth request, use a bandwidth request signaling header, perform a piggybacked bandwidth request, or perform a bandwidth request using a fast feedback channel. The random access based bandwidth request is performed through a bandwidth request channel during non-transmission of a feedback signal and a data signal. The bandwidth request signaling header is a response to reception of an ACK signal for a bandwidth request header from the eNB and may be transmitted to the eNB. The piggybacked bandwidth request is for transmitting the bandwidth request together with data when the data is present at a bandwidth request transmission time. If a fast feedback signal to be transmitted is present at the bandwidth request transmission time, the bandwidth request may be transmitted by the UE to the eNB through the PFBCH. Therefore, although the bandwidth request channel in Table 2 is substantially a kind of a control channel, it has the lowest priority because there are plenty of retransmission methods and opportunity.

Referring to Table 2, the HARQ feedback channel for transmitting an ACK/Negative Acknowledgement (NACK) signal which is a response to data transmission of the eNB has the highest priority because it is an essential channel to perform a HARQ operation for raising transmission efficiency of packet data by reducing retransmission demand from the UE to the eNB.

The PFBCH/SFBCH channel is used for transmission of a Channel Quality Indicator (CQI), a Space Timing Coding (STC) rate indicator, a Precoding Matrix Index (PMI), etc. The PFBCH/SFBCH channel is associated with DL scheduling, DL user selection, and resource allocation and may have priority following the HARQ feedback channel.

Meanwhile, when synchronization of a UL is not matched, the eNB does not recognize the UE and thus resource allocation and next communication may not be properly performed. Accordingly, since a UE synchronized with a specific eNB needs to perform tracking to maintain synchronization by transmitting a periodic ranging signal, a ranging channel necessary for maintaining synchronization between the UE and the eNB has a high priority.

A sounding reference signal (or sounding signal) is a signal transmitted in a synchronized state. The eNB estimates the state of a UL channel based on the sounding reference signal received from the UE and performs scheduling (e.g. user selection and resource allocation) according to the estimated channel state. In order for the UE to stably transmit the sounding reference signal to the eNB, since the UE should maintain synchronization with the eNB, a sounding channel on which the sounding reference signal is transmitted may have a lower priority than the synchronized ranging channel.

Since data has the opportunity for retransmission even in the case of transmission failure, a data channel may have a lower priority than the HARQ feedback channel, the PFBCH/SFBCH, the synchronized ranging channel, and the sounding channel.

Table 3 shown below indicates another example of priorities of transport channels, transmit powers of which are determined by the UE.

TABLE 3

| Priority | Channel Type |
| --- | --- |
| 1 | HARQ feedback |
| 2 | Synchronized Ranging |
| 3 | PFBCH/SFBCH |
| 4 | Sounding |
| 5 | DATA |
| 6 | Bandwidth Request |

Referring to Table 3, the HARQ feedback channel, the sounding channel, the data channel, and the bandwidth request channel are equal in priority to those shown in Table 2. However, the priorities of Table 3 are determined in consideration of update of transport channels along with importance and retransmission possibility of the transport channels and may be applied when the PFBCH/SFBCH is updated at a fast period. When the PFBCH/SFBCH is updated at a fast period, since the PFBCH/SFBCH will be immediately updated in the case of transmission failure, the same effect as retransmission of fast feedback information can be obtained. Hence, the priority of the PFBCH/SFBCH may be lower than the priority of the synchronized ranging channel.

Table 4 to Table 6 indicate examples of priorities of transport channels, transmit powers of which are determined by the UE.

TABLE 4

| Priority | Channel Type |
| --- | --- |
| 1 | PFBCH/SFBCH |
| 2 | Synchronized Ranging |
| 3 | HARQ feedback |
| 4 | Sounding |
| 5 | DATA |
| 6 | Bandwidth Request |

Referring to Table 4, although the HARQ feedback channel is important, since the eNB is capable of retransmitting data through NACK processing for a DL packet even when the UE fails to transmit an ACK/NACK signal, the HARQ feedback channel is set to have a low priority.

TABLE 5

| Priority | Channel Type |
| --- | --- |
| 1 | PFBCH/SFBCH |
| 2 | Synchronized Ranging |
| 3 | Sounding |
| 4 | HARQ feedback |
| 5 | DATA |
| 6 | Bandwidth Request |

Referring to Table 5, since the eNB estimates the state of the UL channel based on the sounding reference signal and performs scheduling, an inaccurate sounding reference signal may have a negative effect on UL closed-loop MIMO transmission and UL scheduling of the UE. In consideration of the necessity for accurate transmission of the sounding reference signal, the eNB that has not received HARQ feedback may set the sounding channel to have a higher priority than the HARQ feedback channel that is set to have a low priority by retransmitting a previously transmitted DL packet. Notably, since the sounding signal should be transmitted in a synchronized state, the priority of the sounding channel may be lower than the priority of the synchronized ranging channel.

TABLE 6

| Priority | Channel Type |
| --- | --- |
| 1 | PFBCH/SFBCH |
| 2 | HARQ feedback |
| 3 | Synchronized Ranging |
| 4 | Sounding |
| 5 | DATA |
| 6 | Bandwidth Request |

Referring to Table 6, failure of HARQ feedback causes data retransmission. Since an increase in the number of retransmissions means that resources for corresponding data should be persistently allocated, resources for allocating a new packet to a new UE are reduced and thus overall system performance may be degraded. In Table 5, the HARQ feedback channel is set to have priority lower than the PFBCH/SFBCH in consideration of retransmission possibility of corresponding data but higher than the synchronized ranging channel in consideration of a problem caused by failure of persistent HARQ feedback transmission.

In relation to Table 2 to Table 6, although the bandwidth request channel has the lowest priority, if a bandwidth request is urgent, the bandwidth request channel may be set to have a higher priority than any one of the HARQ feedback channel, the PFBCH/SFBCH, the synchronized ranging channel, the sounding channel, and the data channel.

Meanwhile, the priority of the data channel may be relatively high according to the system operating scheme of the UE and the eNB or to the environment and state of the overall radio communication. The following Table 7 indicates an example of priorities in a system in which an importance degree of data is high in priorities of UL related information.

TABLE 7

| Priority | Channel Type |
|---|---|
| 1 | PFBCH/SFBCH |
| 2 | DATA |
| 3 | HARQ feedback |
| 4 | Synchronized Ranging |
| 5 | Sounding |
| 6 | Bandwidth Request |

In the above-described priorities, even between data channels, different priorities may be assigned according to a Modulation and Coding Scheme (MCS) level, or according to whether the data channels are for retransmission packets, whether persistent allocation for reducing allocation overhead for connection with a periodic traffic pattern and a relatively fixed payload size is applied, or whether the data channels are for group allocation, for example, Voice over Internet Protocol (VoIP). It may be possible to allocate an equal power to the data channels without priority. If different priorities are assigned to the data channels, a Medium Access Control (MAC) control message including control information on a MAC layer which is in charge of mapping between a logical channel and a transport channel will have a higher priority than general user data.

Figure 2:
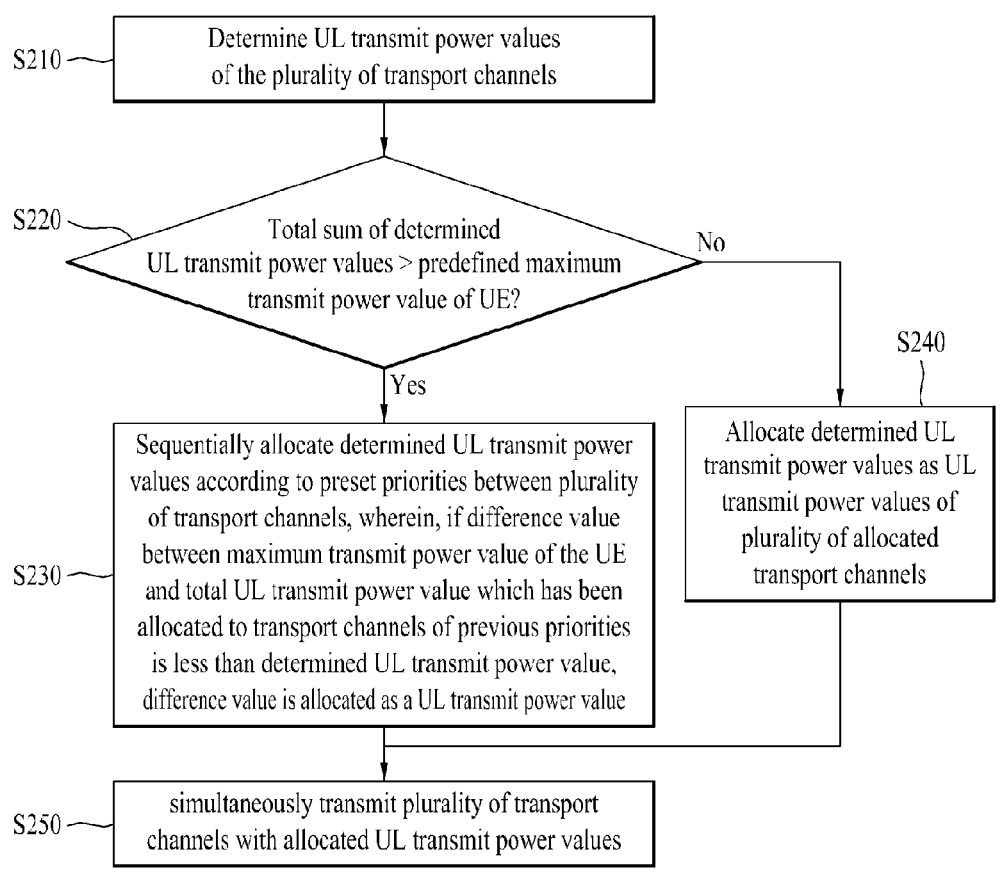
FIG. 2 is a diagram illustrating an example of a process for a UE to control UL transmit powers to simultaneously transmit a plurality of transport channels according to the present invention.

FIG. 2 is a diagram illustrating an example of a process for a UE to control UL transmit powers to simultaneously transmit a plurality of transport channels according to the present invention.

Referring to FIG. 2, in a situation in which a UE is to simultaneously transmit a plurality of allocated transport channels (control channels and data channels), the processor 155 of the UE may determine UL transmit power values of the plurality of allocated transport channels using Equation 1 (step S210). The processor 155 of the UE may compare the total sum of the determined UL transmit power values for the plurality of allocated transport channels according to Equation 1 with a simultaneously transmittable maximum transmit power value (step S220). If the total sum of the determined UL transmit power values for the plurality of allocated transport channels is greater than the simultaneously transmittable maximum transmit power value, the processor 155 of the UE may allocate the UL transmit power values determined in step S210 starting from a transport channel corresponding to a high priority according to preset priorities between the plurality of transport channels (priorities shown in Table 2 to Table 7 and priorities shown in Table 8 which will be described later) (step S230). In this case, since a total UL transmit power value of the UE is limited to the maximum transmit power value, if a difference value between the maximum transmit power value of the UE and a total UL transmit power value which has been pre-allocated to transport channels up to previous priorities is less than a UL transmit power value, determined in step 210, for a transport channel to be allocated, the processor 155 of the UE may allocate the difference value as the UL transmit power value of the transport channel to be allocated (step S230). Thus, if the processor 155 of the UE allocates the determined UL transmit power values starting from a channel having a high priority, a transmit power value less than a UL transmit power value calculated using Equation 1 may be allocated to some channels having a low priority due to the limited maximum transmit power value (step S230).

However, if the total sum of the determined UL transmit power values for the plurality of allocated transport channels is equal to or less than the simultaneously transmittable maximum transmit power value, the processor 155 of the UE may allocate the UL transmit power values for the respective transport channels determined in step S210 as UL transmit power values to be used for transport channel transmission (step S240).

Next, the UE may simultaneously transmit the plurality of transport channels with the allocated UL transmit power values for the plurality of transport channels (step S250). If transmit power values less than the UL transmit power values calculated using Equation 1 are allocated to some channels having a low priority, the UE may transmit a UL signal even with an insufficient power (step S250).

To aid in understanding, details in association with FIG. 2 are described by way of example. Transport channels A, B, and C may be allocated by the eNB the UE as simultaneous transmission channels. It is assumed that a maximum transmit power value that the UE can simultaneously transmit is 23 dBm. The processor 155 of the UE may determine UL transmit power values for transport channels A, B, and C using the above Equation 1. It is assumed that the determined UL transmit power values for transport channels A, B, and C are 10 dBm, 9 dBm, and 6 dBm, respectively. It is also assumed that a high priority is predefined in order of transport channels A, B, and C. In this case, the processor 155 of the UE allocates the UL transmit power values in order of transport channels A, B, and C according to priority. First, the processor 155 of the UE may allocate 10 dBm determined by Equation 1 for transport channel A to transport channel A as the UL transmit power value. Since a difference value between the maximum transmit power value of 23 dBm and the UL transmit power value of 10 dBm allocated to transport channel A is 13 dBm which is greater than the determined UL transmit power value of 9 dBm for transport channel B of the next priority, the processor 155 of the UE may allocate the determined UL transmit power value of 9 dBm to the transport channel B as the UL transmit power value. Next, since a difference value between the maximum transmit power value of 23 dBm and the UL transmit power values of 19 dBm (=10 dBm+9 dBm) allocated to transport channels A and B is 4 dBm which is less than the determined UL transmit power value of 6 dBm for transport channel C, the processor 155 of the UE cannot allocate all of 6 dBm to transport channel C due to the limited maximum transmit power value and can allocate only 4 dBm to transport channel C.

In this way, the UE can simultaneously transmit transport channels A, B, and C with 10 dBm, 9 dBm, and 4 dBm allocated respectively to channels A, B, and C.

In the above description, the HARQ feedback channel has been exemplified as a transport channel corresponding to the highest priority in Table 2, etc.

As another embodiment of the present invention, even in the case of the HARQ feedback channel, a method for setting detailed priorities according to a message type of the eNB for which an ACK/NACK signal is transmitted through the HARQ feedback channel is described. Even in this case, the priorities shown in Table 2 are applied but the priorities are further divided according to a message type carrying control information.

First, transmission of the HARQ feedback channel of the UE is described in brief. The UE performs a HARQ feedback operation for feeding back a signal indicating whether the UE has successfully received information from the eNB as an ACK or NACK signal to the eNB through the HARQ feedback channel. The UE transmits an ACK or NACK signal through the HARQ feedback channel with respect not only to a DL persistent allocation A-MAP IE message type but also to a feedback allocation A-MAP IE message type, a UL persistent allocation A-MAP IE message type, and a feedback polling A-MAP IE message type.

A DL persistent allocation A-MAP IE message is a message transmitted by the eNB to the UE in unicast form, including a DL period of persistent allocation and location and size information of an allocated resource. A feedback allocation A-MAP IE message is a message transmitted by the eNB to the UE in unicast form, including feedback channel index information, frame index information, and subframe index information in a resource region of a UL fast feedback control channel. A UL persistent allocation A-MAP IE message is a message transmitted by the eNB to the UE in unicast form, including a UL period of persistent allocation and location and size information of an allocated resource. A feedback polling A-MAP IE message is a message through which the eNB causes the UE to schedule MIMO feedback transmission.

Among message types for which the UE transmits the ACK or NACK signal through the HARQ feedback channel, the highest priority is assigned to ACK/NACK signal transmission for the DL persistent allocation A-MAP IE message type and the next priorities may be assigned to ACK/NACK signal transmission for message types (i.e. message types carrying control information) except for the DL persistent allocation A-MAP IE message type.

If the UE does not transmit a NACK signal for the DL persistent allocation A-MAP IE, the eNB judges the NACK signal for the DL persistent allocation A-MAP IE as an ACK signal by mis-detection of null transmission and allocates corresponding resources to other UEs, thereby generating collision between UEs. Accordingly, since a response to whether the UE has successfully received the DL persistent allocation A-MAP IE is very important, the processor 155 of the UE may determine a UL transmit power value, with the highest priority, for the HARQ feedback channel for transmission of the NACK signal as to whether the DL persistent allocation A-MAP IE has been successfully received and allocate the determined value to the HARQ feedback channel as the UL transmit power value. Thus, the highest priority is assigned to the NACK signal for the DL persistent allocation A-MAP IE to aid in accurate judgment of the eNB and to effectively prevent data collision between UEs.

Next, the processor 155 of the UE may calculate transmit power values for ACK/NACK transmission for message types except for the DL persistent allocation A-MAP IE in the case of transmission of the HARQ feedback channel and allocate allowable transmit power values. The processor 155 of the UE may calculate UL transmit power values for channels having low priorities in order of priority and allocate the UL transmit power values in order of priority within a range which does not exceed a maximum transmit power value that can be simultaneously transmitted by the UE.

As another example, it is considered to set ACK/NACK signals for other message types to have the highest priority together with the ACK/NACK signal for the DL persistent allocation A-MAP IE transmitted through the HARQ feedback channel. This is described with reference to Table 8. Table 8 shows another example of priorities of transport channels, transmit powers of which are determined by the UE.

TABLE 8

| Priority | Channel type |
| --- | --- |
| 1 | HARQ feedback for ACK information or NACK information used to ensure that the MS has received DL persistent allocation A-MAP IE, Feedback allocation A-MAP IE, UE persistent allocation A-MAP IE, and Feedback polling A-MAP IE successfully |
| 2 | PFBCH/SFBCH |
| 3 | Synchronized Ranging |
| 4 | Sounding |
| 5 | Data |
| 6 | Bandwidth Request |
| 7 | HARQ feedback for NACK information except which used to ensure that the MS has received DL persistent allocation A-MAP IE, Feedback allocation A-MAP IE, UE persistent allocation A-MAP IE, and Feedback polling A-MAP IE successfully |

Referring to Table 8, the same priority as in Table 2 is applied. However, in transmission of the HARQ feedback channel of the highest priority, it is considered to add transmission of ACK/NACK signals for other message types as the highest priority together with the ACK/NACK signal for the DL persistent allocation A-MAP IE.

As an example, the UE may consider a feedback allocation A-MAP IE message type, a UL persistent allocation A-MAP IE message type, and a feedback polling A-MAP IE message type, in addition to the DL persistent allocation A-MAP IE message type, for which the UE transmits ACK/NACK signals through the HARQ feedback channel. Namely, the processor 155 of the UE may allocate transmit power values as the highest priority not only to the ACK/NACK signal for the DL persistent allocation A-MAP IE message type but also to the ACK/NACK signals for the feedback allocation A-MAP IE message type, the UL persistent allocation A-MAP IE message type, and the feedback polling A-MAP IE message type. Moreover, the processor 155 of the UE may allocate transmit power values by assigning the highest priority to any one of these four message types or assigning the highest priority to two or more combinable message types among the four message types.

However, the processor 155 of the UE does not allocate transmit power values as the highest priority with respect to all ACK or NACK information transmitted through the HARQ feedback channel as shown in Table 8. The processor 155 of the UE may allocate transmit power values by assigning a lower priority than the bandwidth request channel with respect to transmission of ACK/NACK signals for message types except for the DL persistent allocation A-MAP IE message type, the feedback allocation A-MAP IE message type, the UL persistent allocation A-MAP IE message type, and the feedback polling A-MAP IE message type. That is, the processor 155 of the UE may allocate UL transmit power values by assigning the lowest priority with respect to transmission of ACK/NACK signals for message types except for the DL persistent allocation A-MAP IE message type, the feedback allocation A-MAP IE message type, the UL persistent allocation A-MAP IE message type, and the feedback polling A-MAP IE message type among ACK/NACK signals transmitted through the HARQ feedback channel.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious that claims that do not explicitly cite each other in the appended claims may be presented in combination as an exemplary embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description and all changes coming within the meaning and equivalency range of the appended claims are intended to be embraced therein.

INDUSTRIAL APPLICABILITY

A UE for controlling UL transmit power and a method for the UE to control the UL transmit power in a wireless communication system is applicable to various communication systems such as IEEE 802.16, 3GPP LTE, and LTE-A.

The invention claimed is:

1. A method for controlling an uplink transmit power by a user equipment in a wireless communication system, comprising:
   determining uplink transmit power value for each of a plurality of allocated transmission channels;
   sequentially allocating the uplink transmit power values to the transmission channels starting from a transmission channel corresponding to the highest priority according to predefined priorities of the plurality of transmission channels if the total sum of each of the determined uplink transmit power values for the plurality of transmission channels is greater than a maximum transmit power value of the user equipment; and
   simultaneously transmitting the plurality of transmission channels with the allocated uplink transmit power values,
   wherein the transmission channel having the highest priority is a Hybrid Automatic Repeat reQuest (HARQ) feedback channel for responding to whether at least one of a downlink persistent allocation A-MAP IE message, a feedback allocation A-MAP IE message, an uplink persistent allocation A-MAP IE message, and a feedback polling A-MAP IE message has been successfully received.

2. The method of claim 1, wherein a transmission channel having the lowest priority among the priorities is a HARQ feedback channel for responding to whether messages except for the downlink persistent allocation A-MAP IE message, the feedback allocation A-MAP IE message, the UL persistent allocation A-MAP IE message, and the feedback polling A-MAP IE message have been successfully received.

3. The method of claim 1, wherein sequentially allocating the uplink transmit power values includes allocating the uplink transmit power values in order of the HARQ feedback channel, a Primary Fast Feedback Channel (PFBCH)/Secondary Fast Feedback Channel (SFBCH), a synchronized ranging channel, a sounding channel, a data channel, and a bandwidth request channel.

4. The method of claim 3, wherein, sequentially allocating the uplink transmit power values includes allocating a difference value between the maximum transmit power value of the user equipment and a total uplink transmit power value allocated to one or more transmission channels according to a predefined priority as an uplink transmit power value for a specific transmission channel, when the difference value is less than the determined uplink transmit power value for the specific transmission channel to which the determined uplink transmit power value is not allocated.

5. The method of claim 1, wherein the plurality of transmission channels includes data channels and control channels.

6. The method of claim 1, wherein the maximum transmit power value of the user equipment is a predefined value for the user equipment or a value determined by the user equipment.

7. A user equipment for controlling uplink transmit power in a wireless communication system, comprising:
   a processor configured to sequentially allocate uplink transmit power values to a plurality of transmission channels starting from a transmission channel corresponding to the highest priority according to predefined priorities of the plurality of transmission channels if the total sum of each of the determined uplink transmit power values for the plurality of transmission channels is greater than a maximum transmit power value of the user equipment; and
   a transmitter configured to simultaneously transmitting the plurality of transmission channels with the allocated uplink transmit power values,
   wherein the transmission channel having the highest priority is a Hybrid Automatic Repeat reQuest (HARQ) feedback channel for responding to whether at least one of a downlink persistent allocation A-MAP IE message, a feedback allocation A-MAP IE message, an uplink persistent allocation A-MAP IE message, and a feedback polling A-MAP IE message has been successfully received.

8. The user equipment of claim 7, wherein a transmission channel having the lowest priority among the priorities is a HARQ feedback channel for responding to whether messages except for the downlink persistent allocation A-MAP IE message, the feedback allocation A-MAP IE message, the uplink persistent allocation A-MAP IE message, and the feedback polling A-MAP IE message have been successfully received.

9. The user equipment of claim 7, wherein the processor allocates the uplink transmit power values in order of the HARQ feedback channel, a Primary Fast Feedback Channel (PFBCH)/Secondary Fast Feedback Channel (SFBCH), a synchronized ranging channel, a sounding channel, a data channel, and a bandwidth request channel.

10. The user equipment of claim 9, wherein the processor allocates a difference value between the maximum transmit power value of the user equipment and a total uplink transmit power value allocated to one or more transmission channels according to a predefined priority as an uplink transmit power value for a specific transmission channel, when the difference value is less than the determined uplink transmit power value for the specific transport channel to which the determined uplink transmit power value is not allocated.

11. The user equipment of claim 7, wherein the plurality of transmission channels includes data channels and control channels.

12. The user equipment of claim 7, wherein the maximum transmit power value of the user equipment is a predefined value for the user equipment or a value determined by the user equipment.

* * * * *